United States Patent
Matsui et al.

[15] 3,660,993
[45] May 9, 1972

[54] TWO-COMPONENT COMPOSITE FILAMENT AND METHOD OF PRODUCING SAME

[72] Inventors: Masao Matsui, Takatsuki; Susumu Tokura, Osaka, both of Japan

[73] Assignees: Kanegafuchi Boseki Kabushiki Kaisha, Tokyo, Japan; Snia Viscosa Societa Nazionale Industria Applicazioni Viscosa S.p.A., Milan, Italy

[22] Filed: Mar. 8, 1971

[21] Appl. No.: 122,188

Related U.S. Application Data

[63] Continuation of Ser. No. 692,479, Dec. 21, 1967, abandoned.

[52] U.S. Cl. .................................66/202, 66/172, 66/187, 18/8 SC, 161/177, 264/168, 264/171
[51] Int. Cl. ...................D04b 21/14, D04b 9/46, D02a 3/00
[58] Field of Search ...................161/173, 177; 264/168, 171, 264/174; 18/8 SC; 66/178, 183, 184, 185, 186, 187, 202, 172

[56] References Cited

UNITED STATES PATENTS

| | | | |
|---|---|---|---|
| 2,428,046 | 9/1947 | Sisson et al. | 161/173 |
| 3,399,108 | 8/1968 | Olson | 161/177 X |
| 3,418,200 | 12/1968 | Tanner | 18/8 SC |
| 3,453,689 | 7/1969 | Hume | 18/8 SC |

*Primary Examiner*—Robert F. Burnett
*Assistant Examiner*—Roger L. May

[57] ABSTRACT

A two-component composite filament having an unbiased dyeability and a suppressed crimpability wherein three distinctly sectioned portions including respectively a part of the periphery of the unitary filament are disposed in a side-by-side relation and extends uniformly throughout the entire length of the filament, two portions among said three portions are separated by an adherent intervened portion therebetween, said separated two portions are composed of one thermoplastic synthetic linear polymer and said intervened portion is composed of another thermoplastic synthetic linear polymer which has different heat shrinkability from that of the former polymer.

11 Claims, 7 Drawing Figures

3,660,993

TWO-COMPONENT COMPOSITE FILAMENT AND METHOD OF PRODUCING SAME

This application is a continuation of Ser. No. 692,479 filed Dec. 21, 1967 and now abandoned.

The present invention relates to a two-component composite filament, wherein three distinctly sectioned portions including respectively a part of the periphery of the unitary filament are disposed in a side-by-side relation and extend uniformly throughout the entire length of the filament, two portions among said three portions are separated by an adherent intervened portion therebetween, said separated two portions are composed of one thermoplastic synthetic linear polymer and said intervened portion is composed of another thermoplastic synthetic linear polymer which has different heat shrinkability from that of the former polymer.

The composite filament according to the present invention has an unbiased dyeability and a suppressed crimpability.

The term "an unbiased dyeability" used with respect to the composite filament throughout this specification and claims means substantially the same dyeability as that of a conventional typical two component composite filament having an identical fineness in which the same two polymers as those forming the above described composite filament are adhered in an equal amount to each other in a side-by-side relation forming unitary abutment surface and extend uniformly along the longitudinal filament axis. Besides, the term "a suppressed crimpability" used throughout this specification and claims means a more or less reduced crimpability as compared with that of the above described conventional typical two component composite filament. When the two-component composite filament of the present invention is formed into yarn, threads, woven fabrics, knitted fabrics, non-woven fabrics, felts, mats, sheets and other structures together with such a conventional two-component filament, these structures have uniform dyeability and different shrinkability between the above two different composite filaments, so that they are applicable for particular uses, specifically for ladies' hosieries.

It has been hitherto well known that two-component composite filament, in which two thermoplastic synthetic polymers having different shrinkabilities are arranged and bonded in an eccentric relation to each other along the entire length of said filament, has latent crimpability and its crimps can be developed upon a suitable heat or swelling treatment. Furthermore, it has been well known that stretchable knitted goods, such as stretchable stocking, etc., can be manufactured from the above mentioned two-component filament. However, when a fabric composed of two or more different textural structure is formed by such conventional composite filaments, the crimpability of such a filament in each structure is influenced by degrees of resistances, such as tension, friction, etc. exerted thereupon which are dependent on the fineness of the monofilament and the textural structure, so that crimps or shrinkages uniform throughout the fabric cannot be obtained when the fabric is subjected to a crimp-developing treatment.

For a better understanding of the invention, reference is made to the accompanying drawings, in which.

Figure 2:
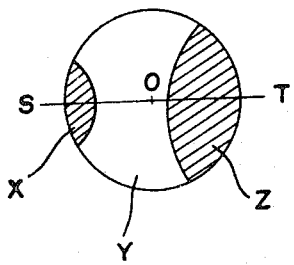
Figure 3:
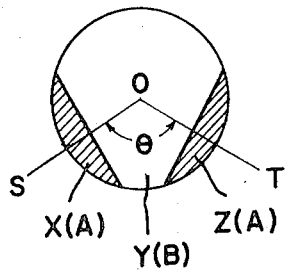
Figure 4:
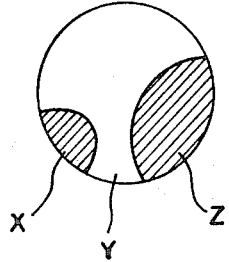
Figure 5:
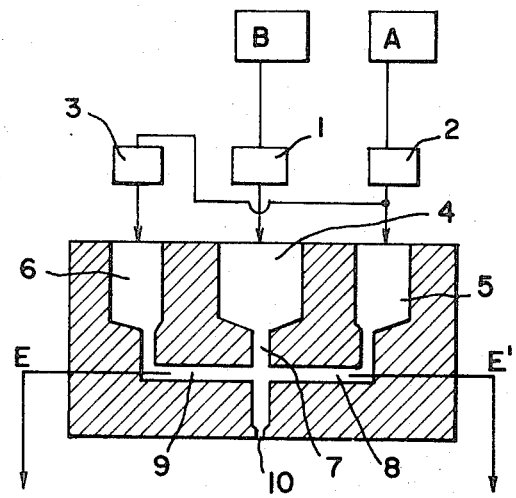
Figure 6:
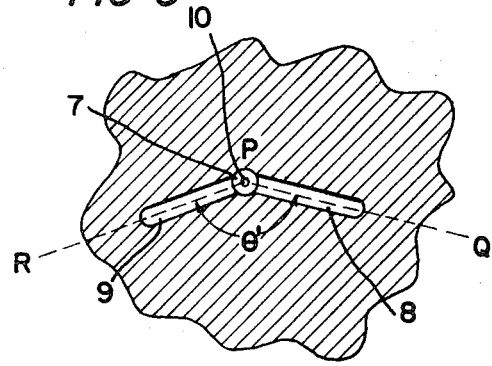

FIGS. 2 through 4 inclusive are cross-sectional views of two-component composite filaments composed of three distinct portions according to the invention; and FIGS. 5 and 6 are diagrammatic views of one embodiment of apparatus for carrying out the process for spinning two-component composite filament according to the invention.

Figure 1A:
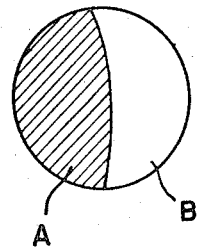
FIG. 1a is a cross-sectional view of a conventional typical side-by-side type two-component composite filament.

In case that a side-by-side type two-component composite filament having a cross-sectional view as shown in FIG. 1a in which two thermoplastic synthetic polymers, for instance, a polyamide and a copolymer thereof are bonded with a conjugate ratio of 1/1, is applied for the manufacture of a stocking, if, for example, a multi-filament yarn of 40 – 50 deniers/6 – 15 filaments is used in the welt portion and a monofilament yarn of 10 – 20 deniers is used in the leg portion, the finished stocking has often narrower welt portion and considerably unsatisfactory appearance, because the size of monofilament of the multifilament yarn in the welt portion is small, so that the yarn has high crimpability. Furthermore, even when yarns used in the welt portion have substantially the same crimpability as that of yarns in the leg portion, the coarser knitting texture in the welt portion causes the filaments therein to shrink more easily, so that the welt portion is liable to become narrower. Therefore, it is necessary to use two-component composite filament having lower shrinkability in the welt portion in order to improve the unbalance in the shape of stocking due to the extremely high shrinkability in the welt portion.

The disclosure in the Belgian Patent specification No. 621,472, shows that a core and sheath type two-component composite filament has been used in the welt portion. However, in this composite filament one component covers the entire surface of the filament, and therefore when the two components have different dyeabilities and if the leg portion is knit with a side-by-side type two-component composite filament which is composed of the same two components as those constituting said core and sheath type two-component composite filament used in the welt portion, the dyeabilities in the welt portion and the leg portion are different. Furthermore, it may be considered to use in the welt portion a two-component composite filament have low shrinkabilities and crimpabilities composed from those constituting two-component composite filament to be used in the leg portion in order to achieve the same purpose. However, in this case the dyeabilities in the welt and leg portions are often different, and moreover the kind of raw polymers for manufacturing various composite filaments which are to be applied for knitting the stockings disadvantageously increases.

In order to solve these problems, there needs an improved two-component composite filament, which is composed of the same two components as those of a conventional highly shrinkable side-by-side type two-component composite filament having a conjugate ratio of 1/1, and which has a suppressed crimpability and an unbiased dyeability as compared with said conventional side-by-side type composite filament.

Figure 1B:
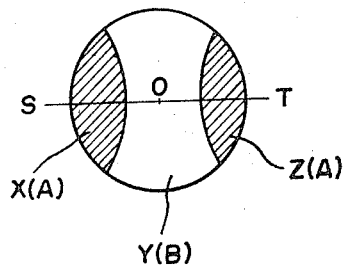
FIG. 1b is a cross-sectional view of a conventional composite filament composed of three distinct portions.

On the other hand, FIG. 1b shows a conventional type of two-component composite filament wherein three distinctly sectioned portion X, Y and Z including respectively a part of the periphery of the unitary filament are disposed in a side-by-side relation and extends uniformly throughout the entire length of the filament, two portions X and Z among said three portions are separated by an adherent intervened portion Y therebetween, said separated two portions X and Z are composed of one thermoplastic synthetic linear polymer A and said intervened portion Y is composed of another thermoplastic synthetic linear polymer B which has different heat shrinkability from that of the polymer A. Irrespective of the different heat shrinkability between polymers A and B, the filament having such a cross-section as shown in FIG. 1b develops substantially no crimps, for two straight lines OS and OT which pass through the center of gravity O of the cross-section and bisect each of the areas of said two separated portions X and Z are on the common straight line ST and moreover two separated portions are of substantially equal area, so that two crimp developing forces which are caused respectively by the differences in the shrinkability between the intervened portion Y and each separated portion X and Z substantially antagonized mutually. We recognized the fact that such a conventional type of two-component filament could be provided with a suppressed crimpability if the two separated portions X and Z were not in a symmetrical balanced position around the filament axis, and thus completed the present invention.

An object of the present invention is to provide a fibrous structure comprising different textures composed respectively of two different side-by-side type composite filaments having different crimpabilities which has excellent appearance and is dyed uniformly. Another object of the present invention is to manufacture a fibrous structure from two different side-by-side composite filaments, in which these filaments are crimped to different degrees to form a varied texture, while the texture can be dyed uniformly throughout. A further object is to provide an improved two component composite filament applicable to these fibrous structures. The other objects may be apparent from the following descriptions:

The present invention consists of an improvement in a two-component composite filament wherein three distinctly sectioned portions including respectively a part of the periphery of the unitary filament are disposed in a side-by-side relation and extends uniformly throughout the entire length of the filament, two portions among said three portions are separated by an adherent intervened portion therebetween, said separated two portions are composed of one thermoplastic synthetic linear polymer and said intervened portion is composed of another thermoplastic synthetic linear polymer which has different heat shrinkability from that of the former polymer, characterized in that two crimp developing forces which are caused respectively by the differences in the shrinkability between said intervened portion and each of said separated portions are substantially not antagonized mutually and 2/5 to 3/5 of the surface area of the filament is formed by said intervened portion.

In the improved filament of this invention, when the above-mentioned two crimp developing forces are of equal magnitude, they should not be so directed as to be mutually antagonized, and when so directed as to be antagonized, they should be substantially of unequal area.

The above-mentioned improved two-component composite filament of the present invention has a cross-section as shown in FIGS. 2 to 4.

In FIG. 2, the three distinctly sectioned portions X, Y and Z are arranged in a side-by-side relation and include respectively a part of the periphery of the cross-section. Two portions X and Z both being composed of the component A are completely separated from each other by the intervened portion Y which is composed of the other component B. The straight line OS passing through the center of gravity O of the cross-section bisects the area of the portion X, while the straight line OT passing through the center of gravity O bisects that of the portion Z. The portions X and Z are positioned in such a manner that those two straight lines are on the common straight line ST but are not of equal area, so that two crimp developing forces which are caused respectively by the differences in the shrinkability between the intervened portion and each separated portion are not mutually antagonized. Thus the filament shown in FIG. 2 has a suppressed crimpability, the degree of which depends on the difference of area between two separated portions, that is, the less the difference of area is, the more suppressed is the crimpability.

In any cases, however, the difference of area between two separated portions should not become nought. The preferred ratio of two separated portions' areas which is required for developing the suppressed crimps lies in the range between 1/20 and 8/9 and more preferably between 1/5 and 1/2.

Another embodiment of the present invention is shown in FIG. 3, where the portions X and Z are of equal area, so that they should be positioned in such a manner that the angle $\theta$ made by the straight lines OS and OT is not 180°, that is, said two straight lines are not on a common straight line. When the angle $\theta$ is less than 180°, the smaller the angle is, the higher is the crimpability and adversely when the angle $\theta$ is more than 180°, the larger the angle, the higher the crimpability. A preferred magnitude of the angle $\theta$ for the purpose of the present invention is about 60° to 160° and specifically about 80° to 140°.

The above mentioned embodiment of the filament of the present invention has the following relation between the angle $\theta$ and a ratio ($x$) of area of portions X and Z in the cross-sectional configuration, $$x\theta \leq 8/9\pi,$$

wherein $\theta$ is the angle by radian made by the straight lines OS and OT, which is less than 180°, and $x$ is the ratio by a proper fraction of area of the portions X and Z.

Moreover, in order to provide the filament with an unbiased dyeability, the total length of the periphery occupied by the portions X and Z should be substantially equal to that occupied by the portion Y. To this end, 2/5 to 3/5 of the peripheral length of the cross-section should be occupied by the intervened portion Y and in other words, the ratio of the sum of the surface area formed by the component A to that formed by the component B should be within a range of 3/2 – 2/3. The most preferred such ratio is about 1/1.

The cross-sectional areas of the portions X and Z may be equal as shown in FIG. 3 or different as shown in FIGS. 2 and 4. However, when they are equal, the spinning can be effected more easily. In case that the areas of portions X and Z are not equal, the larger the difference of the areas is, the high is the crimpability.

Therefore, a two-component composite filament having a desired crimpability, which is composed of three distinct portions, can be obtained by determining properly the angle $\theta$, the difference in the cross-sectional area between the separated portions X and Z and polymers of which the components A and B consist.

The cross-sectional configuration of said filament may be that different from circular such as ellipse, tri-lobal and multi-lobal in addition to circle.

The polymers applicable for manufacturing the filament of the present invention may be any fiber-forming thermoplastic synthetic linear polymers such as polyamides, polyesters, polyetheresters, polyolefins, polycarbonates, polyoxymethylene, polystyrene, polyvinyl chloride, polyvinylidene chloride, copolymers and mixtures thereof, and these polymers incorporated with inorganic or organic substances, such as delustrants, antioxidants, light-stabilizers, heat-stabilizers, anti-static agents, plasticizers, fillers, pigments, dyestuffs, etc., if desired. The most preferred and important polymers to be used in the present invention include polyamides, such as nylon-6, nylon-7, nylon-9, nylon-11, nylon-12, nylon-66, nylon-610, polymetaxylylene adipamide, polyparaxylylene adipamide, etc., and copolyamides obtained by the optional combination of two or more of such polyamide-forming substances as ε-caprolactam, nylon-66 salt, nylon-610 salt, nylon-12 salt, metaxylylene diammonium adipate, paraxylylene diammonium adipate, hexamethylene diammonium terephthalate, hexamethylene diammonium isophthalate, etc.

While having a suppressed latent crimpability, the two-component composite filament according to the invention exhibits an unbiased dyeability, that is, substantially the same dyeability as that of a conventional side-by-side type high crimpable two-component composite filament having a unitary abutment surface with a conjugate ratio of 1/1 due to the fact that the two components occupy substantially equal surface areas on the surface of the composite filament, and therefore it can be advantageously used together with the above mentioned conventional side-by-side type two-component composite filament. As mentioned above, upon manufacturing stretchable lady's stockings, if the two-component composite filament according to the invention is used in the welt portion and the conventional side-by-side type two-component filament used in the leg portion, the obtained stockings highly improve in their shape and appearance and are dyed into a uniform shade. Moreover, in the other uses, such as in the production of a felt having a unique texture, the two-component composite filament according to the invention can be used very advantageously. That is, when it is used in combination with such a conventional side-by-side type two-component composite filament as described above, the obtained felt composed of two kinds of filament with different crimpabilities shows an intricate structure, yielding a unique handing and feeling, and yet has a uniform dyeability. If the two-component composite filament according to the invention is used for mix-spinning with spun yarn and wool yarn for hand knitting, yarns having unique touch and texture also can be obtained.

FIGS. 5 and 6 are diagrammatic views of one embodiment of apparatus for carrying out the process for spinning two-component composite filament according to the invention. FIG. 5 shows a flow sheet of feeding the spinning solution and a longitudinal-sectional view of the spinning apparatus according to the invention. A and B represent two components to be bonded respectively, and the numeral 1 represents a pump for feeding the raw spinning solution of B-component, 2 and 3 pumps for feeding the raw spinning solution of component A, 4 a reservoir for the raw spinning solution of component B, 5 and 6 reservoirs for the raw spinning solution of component A; 7 main channel; 8 and 9 sub-channels, and 10 orifice.

FIG. 5 shows the case wherein the axes of the sub-channels 8 and 9 are perpendicular to the axis of the main-channel, but the former axes may be not perpendicular to the latter axis.

FIG. 6 is a cross-sectional view of the spinning apparatus shown in FIG. 5 taken along the line E-E'. The straight lines QP and RP are the projected lines of the axes of the sub-channels on a plane perpendicular to the axis of the main-channel respectively. The angle $\theta'$ made by the straight line QP and the straight line RP may be either 180° or less than 180°. The pump 3 may be eliminated. For example, in order to make the cross-sectional areas of portions X and Z same, it can be attained by making the flow resistances of the sub-channels 8 and 9 equal. While, in order to make the cross-sectional areas of X and Z different, it can be attained by varying the flow resistances of the sub-channels 8 and 9 and causing a difference in the flow rates of the raw spinning solutions in sub-channels.

In practice of the spinning by means of such an apparatus, the melt of one component B is fed through the main channel 7 and the melt of the other component A is fed through the two sub-channels 8 and 9 and both the components A and B are adhered and extruded from the orifice 10 and in this case, the volume ratio of two flows of the component A fed through the sub-channels 8 and 9 respectively should be properly so selected, so that the following relation formula may be satisfied depending upon the angle $\theta'$ $$x\theta' \leq 8/9\pi$$

wherein, $\theta'$ designates an angle by radian not exceeding $\pi$ radian made by two projections of the axes of sub-channels on a plane perpendicular to the axis of main-channel, and $x$ is the above-mentioned volume ratio expressed by a proper fraction.

Furthermore, in order to obtain the composite filament having unbiased dyeability, the volume ratio of components A and B fed must be so selected that the surface area formed by the component B may be in the range of 2/5 to 3/5 of the total surface area of the resulting filament.

In order to attain the object of the present invention, the above described $\theta'$ is 60° to 160° ($\pi/3 - 8/9\pi$ radian), preferably, 80° to 140° ($4/9\pi - 7/9\pi$ radian).

The value of $x$ is 1/20 to 8/9, preferably, 1/5 to 1/2.

The invention will be exaplined further by the following examples, "Part" in the examples means by weight.

EXAMPLE 1

A copolymer having an intrinsic viscosity of 1.20 in m-cresol at 25° C., which was composed of 90 parts by weight of nylon-6 and 10 parts by weight of polyhexamethyleneisophthalamide, was used as component A. A nylon-6 having an intrinsic viscosity of 1.25 was used as component B.

Using an apparatus as shown in FIG. 5, the melted component A was fed into the spinneret through pumps 2 and 3 in an amount of 15 parts respectively, the total amount being 30 parts and 70 parts of melted component B were fed through pump 1. The sub-channels 8 and 9 have equal diameters and the angle $\theta'$ was 120°.

The component A and the component B were bonded to each other at each orifice 10 and then simultaneously extruded and solidified by air-quenching to form a unitary composite filament.

The formed filaments were successively oiled and wound up on a take-up tube, which were then drawn 3.6 times their original lengths at room temperature (25° C., 65% R.H.) to obtain a drawn two-component composite multifilament C of 45 deniers/7 filaments, each unitary filament of which had a cross-section as shown in FIG. 3.

On the other hand, in a conventional manner components A and B were spun simultaneously through each common orifice to form a conventional composite filament in which the above two components were bonded in a side-by-side relation with a conjugate-ratio of 1:1. The spun filament was then subjected to the quenching, oiling, wind-up and drawing processes in the same condition as the filament C and obtained was a two-component composite multifilament D of 45 deniers/7 filaments, each unitary filament of which had a cross-section as shown in FIG. 1a.

The shrinking percentages in hot water of filaments C and D are shown in the following Table 1.

When filaments C and D were dyed under the same condition, they showed substantially the same shades and colors.

TABLE 1

| | Shrinking percentage (%) |
|---|---|
| Filament C | 57 |
| Filament D | 85 |

The shrinking percentage was calculated by the following formula.

$$\text{Shrinking percentage} = \frac{lo - l1}{lo} \times 100 (\%)$$

In the above formula, $l0$ is the original length of the filament and $l1$ is the length after the filament is dipped in boiling water for 10 minutes under no load and dried in air.

EXAMPLE 2

The same components A and B as described in Example 1 were used. Using the apparatus as shown in FIG. 5, 60 parts by weight of the melted component B were fed into the spinneret through pump 1 and the melted component A was fed through pumps 2 and 3 in amount of 28 and 12 parts respectively, the total amount being 40 parts. The sub-channels 8 and 9 had equal diameter and the angle $\theta'$ was 130°.

The component A and the component B were bonded to each other at each orifice 10 and then simultaneously extruded and solidified by air-quenching to form a unitary composite filament.

The formed filaments were successively oiled and wound up on a take-up tube, which were then drawn 3.6 times their original lengths at room temperature (25° C., 65% R.H.) to obtain a two-component composite multifilament F of 45 deniers/7 filaments, each unitary filament of which had a cross-section as shown in FIG. 4. The obtained filament had a shrinking percentage in hot water of 62.5 percent.

On the other hand, components A and B were spun simultaneously through a common orifice to form a conventional composite filament in which the above two components were bonded in a side-by-side relation with a conjugate-ratio of 1:1. The spun filament was then subjected to the quenching, oiling, wind-up and drawing processes in the same condition as the filament F and obtained was a two-component composite monofilament G of 15 deniers, which had a cross-section as shown in FIG. 1a.

Filament D obtained in Example 1 and the above mentioned filament F were twisted in 200 T/M, taken up on an aluminum bobbin, and treated with saturated steam at 100° C. for 30 minutes to obtain filaments D' and F' respectively. Filament G was twisted in 120 T/M, taken upon on an aluminum bobbin, and treated with saturated steam at 75° C. for 15 minutes to obtain filament G'. Each filament had not yet been crimped at all at that moment. After the above-mentioned twisting and steaming treatments, the filaments were taken up on cones again and were knit into a stocking. A plain stitch seamless stocking H was knit by using filament D' for welt, heel and toe portions, and filament G' for leg portion by means of a knitting machine having 400 needles. In the same manner, another stocking J was knit by using filament F' for welt, heel and toe portions, and filament G' for leg portion. After knitting, each base fabric of the stockings (stockings H and J) was treated with saturated steam at 100° C. for 30 minutes under tensionless state to develop crimps, and dyed. Then the dyed stocking was placed on a board and subjected to boarding with saturated steam at 118° C. for 45 seconds, and dried. The dried stockings were removed from the board, and left to stand for one day under tensionless state in an atmosphere of 65% R.H. at 25° C. to obtain stretchable stockings H' and J'.

The stretchable stocking H' thus obtained had a welt portion having a width of 9.6 cm under tensionless state, which was smaller than the width of 11.2 cm in the upper leg portion, so that the welt portion and the leg portion were not balanced in the width. On the other hand, the stretchable stocking J' had a welt portion having a width of 12.5 cm in tensionless state, which balanced with the width (11.2 cm) of the upper leg portion satisfactorily. Moreover, the welt portion had substantially the same dyeability as that of the leg portion in the stocking J'. Thus, the stocking J' was of very excellent quality.

EXAMPLE 3

The same components A and B as described in Example 1 were used. These plymers were melted separately and were simultaneously extruded from a common spinneret orifice to form a unitary filament K which consisted of three distinct sectioned portions extending in side-by-side relation along the longitudinal axis of the filament. Two separated portions X and Z were formed by the polymer A and arranged in such a manner as shown in FIG. 1b. Changing the volume ratio of two portions X and Z, three kinds of filament L, M and N as shown in FIG. 2 were prepared. The cross-sectional areas as well as the surface areas in percentage occupied by each portion of these filaments are shown in the following Table 2.

TABLE 2

| Sample | Portion | Area (%) Cross-section | Surface | Ratio of cross-sectional area (X/Z) |
|---|---|---|---|---|
| K | X | 25 | 25 | |
|   | Y | 50 | 50 | 1 |
|   | Z | 25 | 25 | |
| L | X | 34 | 35 | |
|   | Y | 50 | 50 | 2.1 |
|   | Z | 16 | 15 | |
| M | X | 40 | 41 | |
|   | Y | 50 | 45 | 4 |
|   | Z | 10 | 14 | |
| N | X | 48 | 45 | |
|   | Y | 50 | 50 | 24 |
|   | Z | 2 | 5 | |

The above-described undrawn filaments were drawn 4.2 times their original lengths at room temperature to obtain drawn filaments of 15 deniers/mono-filament which exhibited shrinking percentages as shown in Table 3.

TABLE 3

| Sample | Shrinking percentage (%) |
|---|---|
| K | 29.7 |
| L | 45.0 |
| M | 58.3 |
| N | 82.1 |

As is apparent from the Table 3, the filament K developed substantially no crimps, whereas the filament N developed unsuppressed crimps almost identical to those which conventional two-component side-by-side type composite filament as shown in FIG. 1a developed. Crimps developed in the filaments L and M were properly suppressed.

What is claimed is:

1. A unitary composite filament of unbiased dyeability and suppressed crimpability having two components which are:
   a. a first component thermoplastic synthetic linear polymer; and
   b. a second component thermoplastic synthetic linear polymer the said first component and the said second component having different degrees of heat shrinkability, the core of said composite filament being said second component with two distinct portions of the said first component being at the periphery of said unitary composite filament, the components being disposed in a side-by-side relationship extending uniformly throughout the length of said unitary composite filament, and wherein the crimp developing forces of each of said distinct portions of the said first component are not substantially counterbalanced by situating said distinct portions at an angle theta on the periphery of said unitary composite filament, the angle theta being defined by the formula $$\text{theta} \leq 8/9\,\pi$$

wherein
theta is the angle formed by the two lines beginning from the center of gravity of the cross-section of said unitary composite filament and extending to said distinct portions of said first component, bisecting said distinct portions;
the total length of the periphery in the cross-section occupied by the second component being 40 to 60 percent of the total peripheral length of the filament and the cross-section of the filament being substantially circular.

2. The unitary composite filament of claim 1, wherein the total length of the periphery in the cross-section occupied by the second component comprises about 50 percent of the total peripheral length of the filament.

3. The unitary composite filament of claim 1, wherein theta is between $\pi/3$ radian and $8/9\pi$ radian.

4. The unitary composite filament of claim 1, wherein theta is between $4/9\pi$ radian and $7/9\pi$ radian.

5. The unitary composite filament of claim 1, wherein the cross-sectional area of each of said distinct portions is substantially equal.

6. The unitary composite filament of claim, wherein said thermoplastic synthetic linear polymer is a polyamide, polyester, polyetherester, polyolefin, polycarbonate, polyoxymethylene, polystyrene, polyvinyl chloride, polyvinylidene chloride, or a copolymer or mixture thereof.

7. The unitary composite filament of claim 1, wherein said thermoplastic synthetic linear polymer is a polyamide selected from the group consisting of nylon-6, nylon-7, nylon-9, nylon-11, nylon-12, nylon-66, nylon-610, polymetaxylylene adipamide, polyparaxylylene adipamide and copolyamides derived from at least two polyamide-forming substances selected from the group consisting of $\epsilon$-caprolactam, nylon-66 salt, nylon-610 salt, nylon-12 salt, metaxylylene diammonium adipate, paraxylylene diammonium adipate, hexamethylene diammonium terephthalate and hexamethylene diammonium isophthalate.

8. A fibrous article comprising said unitary composite filament of claim 1.

9. A fibrous article comprising two filaments which are
   a. a first filament corresponding to said unitary composite filament of claim 1; and
   b. a second filament which is a conventional side-by-side two component composite filament.

10. A hosiery of improved appearance and shape for women's wear which comprises a. welt, heel and toe portions knit with said unitary composite filament of claim 1; and
b. a leg portion knit with a conventional side-by-side type two-component composite filament.

11. A knit fabric consisting essentially of said unitary composite filament of claim 1.

* * * * *